(12) United States Patent
Gess

(10) Patent No.: US 8,372,507 B1
(45) Date of Patent: *Feb. 12, 2013

(54) END USER FILLED PROTECTIVE PACKAGING WITH SELF-SEALING AIR BUBBLES

(75) Inventor: Larry C. Gess, Palmyra, WI (US)

(73) Assignee: Ivex Protective Packaging, Inc., Lachine, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,538

(22) Filed: Sep. 14, 2012

Related U.S. Application Data

(60) Provisional application No. 61/538,801, filed on Sep. 24, 2011.

(51) Int. Cl.
*B32B 1/00* (2006.01)
(52) U.S. Cl. ............ 428/178; 428/35.2; 206/522; 383/3
(58) Field of Classification Search .................. 428/34.1, 428/35.2, 166, 178; 410/118, 119, 125, 155; 206/522; 383/3; 141/68, 114, 25
See application file for complete search history.

(56) References Cited

U.S. PATENT DOCUMENTS

| | | | |
|---|---|---|---|
| 4,983,138 A | 1/1991 | McGrath | |
| 6,913,803 B2 * | 7/2005 | Peper | 428/35.2 |
| 7,168,566 B2 * | 1/2007 | Anderson et al. | 206/522 |
| 7,168,567 B2 * | 1/2007 | Peper et al. | 206/522 |
| 7,521,111 B2 * | 4/2009 | Matarasso | 428/178 |
| 7,694,701 B2 | 4/2010 | Koyanagi | |
| 8,192,120 B1 * | 6/2012 | Gess | 410/119 |
| 8,201,690 B1 * | 6/2012 | Gess | 206/522 |
| 8,215,487 B1 * | 7/2012 | Gess | 206/522 |

* cited by examiner

*Primary Examiner* — N. Edwards
(74) *Attorney, Agent, or Firm* — Donald J. Ersler

(57) ABSTRACT

End user filled protective packaging with self-sealing air bubbles includes a first bubble layer, a second bubble layer and a air channel layer. The first and second bubble layers are sealed together to form a plurality of bubble chambers. A plurality of bubble cells are formed in each bubble chamber by extending a plurality of air flow sealing lines. An air flow channel is formed between the second bubble layer and the air channel layer. One end of a cross air fill passage communicates with the air flow channel and the other end communicates with a fill opening in the second bubble layer. Air flows into each cross air flow passage and through the fill opening to inflate the bubble chamber. Inflation of the bubble chamber causes the plurality of air flow sealing lines to seal the cross air fill passage and prevent deflation of the bubble chamber.

17 Claims, 3 Drawing Sheets

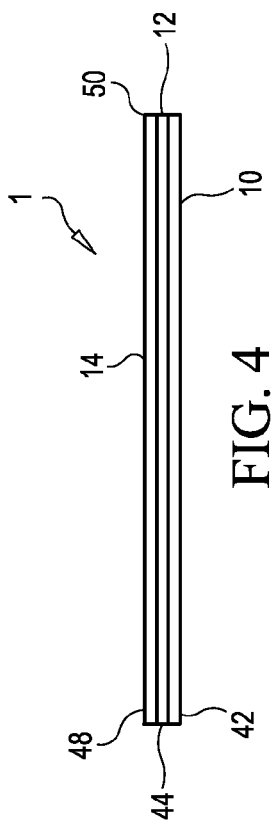
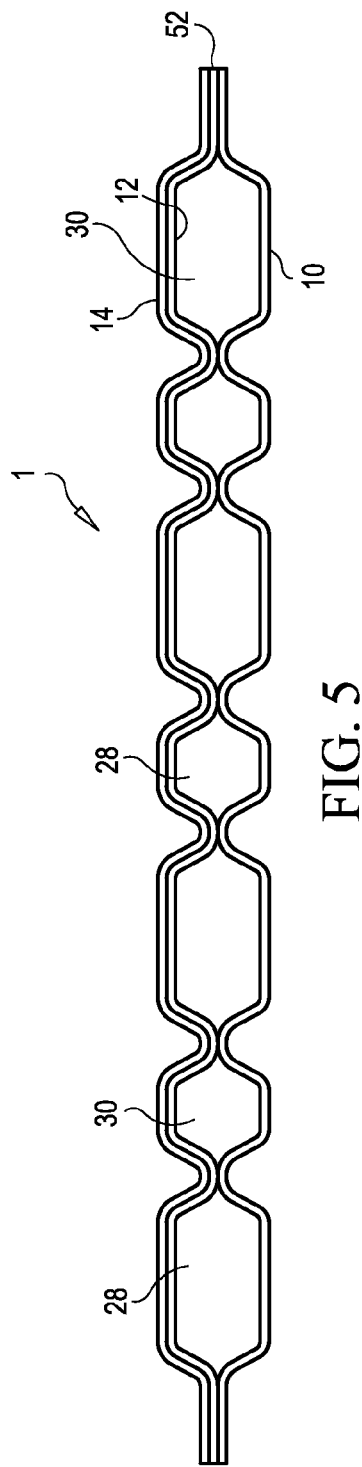
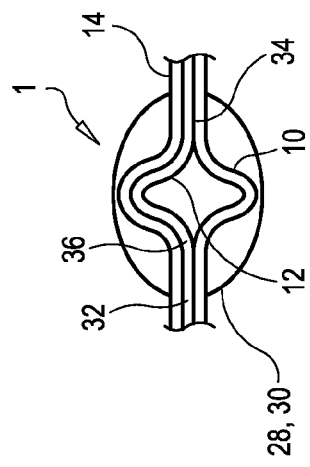

END USER FILLED PROTECTIVE PACKAGING WITH SELF-SEALING AIR BUBBLES

CROSS-REFERENCES TO RELATED APPLICATIONS

This is a nonprovisional patent application taking priority from provisional application No. 61/538,801 filed on Sep. 24, 2011.

BACKGROUND OF THE INVENTION

1. Field of the Invention

The present invention relates generally to inflatable packaging and more specifically to an end user filled protective packaging with self-sealing air bubbles, which does not require complex machinery to fill the inflatable compartments.

2. Discussion of the Prior Art

It is well known in the art of inflatable packaging to fill multiple compartments with air and then seal the multiple compartments to retain the air therein. However, the inflatable packaging is typically complicated or the machinery used to produce the inflatable packaging with air is also complicated. A complicated inflatable packaging will require complicated machinery to fill thereof. A complicated inflatable packaging machine will not always produce a consistent product, due to the complexity of the machine and also variations in the sheet material used to produce the inflatable packaging.

Typically, a manufacturer of inflatable packaging provides a customer with inflatable packaging machines at no cost and sells the inflatable packaging to the customer. Any problems with the inflatable packaging machines is the manufacturer's responsibility and expense. It is to the manufacturer's advantage to have the simplest and most inexpensive inflatable packaging machines to produce the inflatable packaging. Having inexpensive inflatable packaging machinery makes it possible to sell the inflatable packaging to smaller companies.

U.S. Pat. No. 4,983,183 to McGarth discloses an inflatable container with self-sealing valve. The McGarth patent discloses a one layer self-sealing, self-regulating, two-way flat valve for fluid containers, such as toy balloons and the like formed of two heat sealed film layers, is provided. U.S. Pat. No. 7,694,701 to Koyanagi discloses a structure or check valve for air-packing device. A check valve for an air-packing device comprises upper and lower check valve films that are placed between upper and lower packing films that form the air packing device contour. The check valve can be advantageously used for the air-packing device having a multiplicity of air containers.

Accordingly, there is a clearly felt need in the art for an end user filled protective packaging with self-sealing air bubbles, which provides a non-complex inflatable package that may be filled with an uncomplicated inflation apparatus instead of complicated machinery.

SUMMARY OF THE INVENTION

The present invention provides an end user filled protective packaging with self-sealing air bubbles, which does not require complex machinery to fill the inflatable bubbles. The end user filled protective packaging with self-sealing air bubbles (inflatable bubble packaging strip) includes a first bubble layer, a second bubble layer and an air channel layer. The first and second bubble layers are sealed together to form a plurality of bubble chambers. A chamber perimeter sealing line includes a first chamber edge line, a second chamber edge line, a first chamber end line and a second chamber end line to form the bubble chamber. A plurality of bubble cells are formed in each bubble chamber. The plurality of bubble cells are formed by extending a plurality of air flow sealing lines from one of the first and second end chamber lines and extending a plurality of bubble nubs from one of the second and first end chamber lines inline with the plurality of air flow sealing lines. Each air flow sealing line is preferably terminated with a bubble dot. A separation area is preferably formed between two adjacent bubble chambers to allow several bubble chambers to be severed from a continuous strip. A first edge of the first bubble layer is preferably sealed to a first edge of the second bubble layer. The first and second bubble layers are preferably attached to each other with heat sealing.

An air flow channel is formed between the second bubble layer and the air channel layer. The air flow channel preferably includes sealing a first edge of the air channel layer to the first edge of the second bubble layer; sealing a second edge of the air channel layer to a second edge of the second bubble layer; and sealing a portion of the air channel layer to the second bubble layer to form the air flow channel and a plurality of cross air fill passages. One end of each cross air fill passage communicates with the air flow channel and continues across a width of the bubble chamber to substantially the second chamber edge line. A fill slit is preferably formed through the second bubble layer, such that it communicates with the other end of the cross air fill passage. The air channel layer is preferably sealed to the second bubble layer with adhesive.

An inflation pin of an inflation apparatus is inserted into the air flow channel. The continuous strip is pulled through the inflation apparatus, which forces air through the cross air fill passage of each bubble chamber. Air flows through each cross air fill passage; through each fill slit; and fills each bubble chamber. Inflation of the bubble chamber causes the plurality of air flow sealing lines to seal the cross air fill passage and prevent deflation of the bubble chamber. The plurality of air flow sealing lines act as a check valve to prevent air from flowing out of the cross air fill passage.

Accordingly, it is an object of the present invention to provide an end user filled protective packaging with self-sealing air bubbles, which provides a non-complex inflatable package that may be filled with an uncomplicated inflation apparatus instead of complicated machinery.

These and additional objects, advantages, features and benefits of the present invention will become apparent from the following specification.

BRIEF DESCRIPTION OF THE DRAWINGS

FIG. 4 is an end view of an end user filled protective packaging with self-sealing air bubbles in accordance with the present invention.

FIG. 5 is an enlarged end cross sectional view of an inflated continuous strip of an end user filled protective packaging with self-sealing air bubbles in accordance with the present invention.

FIG. 6 is an enlarged lengthwise cross sectional view of an inflated bubble cell of an end user filled protective packaging with self-sealing air bubbles in accordance with the present invention.

DETAILED DESCRIPTION OF THE PREFERRED EMBODIMENTS

Figure 1:
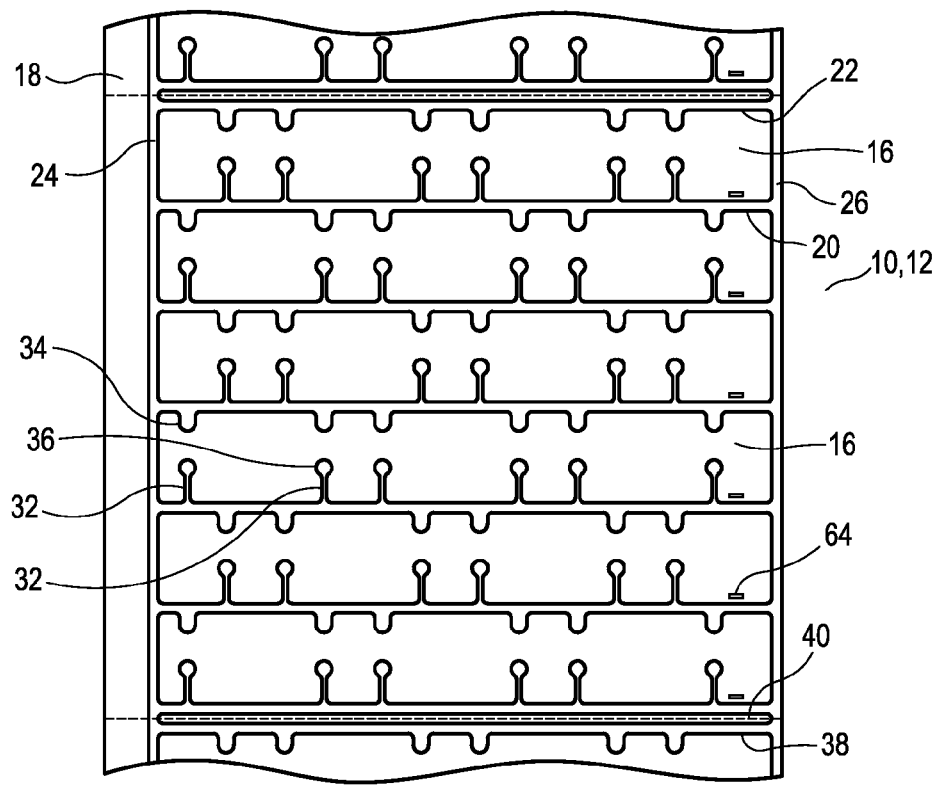
FIG. 1 is a top view of a second bubble layer attached to a first bubble layer of end user filled protective packaging with self-sealing air bubbles in accordance with the present invention.
Figure 2:
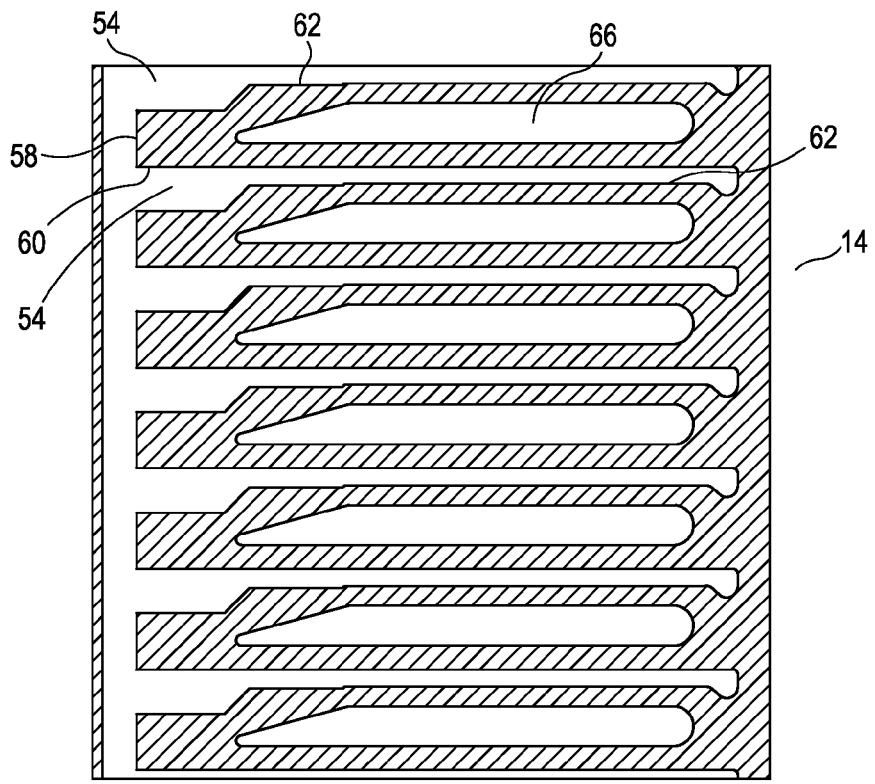
FIG. 2 is a top view of an air channel layer illustrating attachment areas between the air channel layer and a second bubble layer before attachment of end user filled protective packaging with self-sealing air bubbles in accordance with the present invention.
Figure 3:
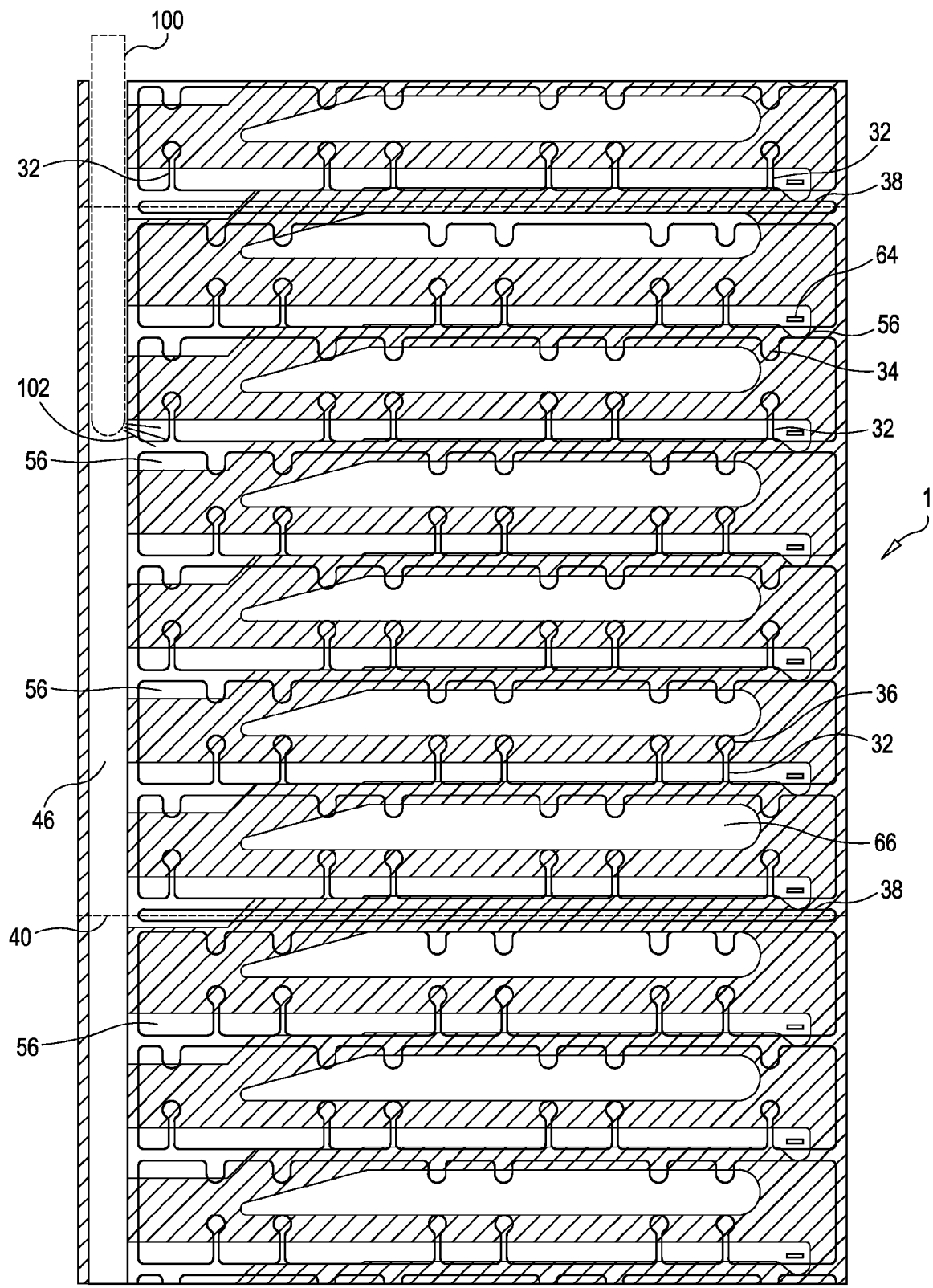
FIG. 3 is a top view of an air channel layer attached to first and second bubble layers illustrating a plurality of bubble chambers of an end user filled protective packaging with self-sealing air bubbles in accordance with the present invention.

With reference now to the drawings, and particularly to FIG. 3, there is shown a top view of an assembled inflatable bubble packaging strip 1. With reference to FIGS. 1-2 and 4-6, the inflatable bubble packaging strip 1 includes a first bubble layer 10, a second bubble layer 12 and an air channel layer 14. The first and second bubble layers are sealed together to form a plurality of bubble chambers 16. The first bubble layer 10, the second bubble layer 12 and the air channel layer 14 are preferably fabricated from a transparent stretchable plastic sheet material. A chamber perimeter sealing line 18 includes a first chamber edge line 20, a second chamber edge line 22, a first chamber end line 24 and a second chamber end line 26 to form the bubble chamber 16. A plurality of bubble cells 28, 30 are formed in each bubble chamber 16. The plurality of bubble cells 28, 30 are formed by extending a plurality of air flow sealing lines 32 from one of the first and second end chamber lines and extending a plurality of bubble nubs 34 from one of the second and first end chamber lines inline with the plurality of air flow sealing lines 32.

A single bubble cell 28 is formed between two widely spaced air flow sealing lines 32 and a single bubble cell 30 is formed between two closely spaced air flow sealing lines 32. Each air flow sealing line 32 is preferably terminated with a bubble dot 36. A separation area 38 is preferably formed between two adjacent bubble chambers 16 to allow several bubble chambers 16 to be severed from the continuous strip 1. A perforation line 40 is formed in the middle of the separation area 38. A first edge 42 of the first bubble layer 10 is preferably sealed to a first edge 44 of the second bubble layer 12. The first and second bubble layers are preferably attached to each other with heat sealing to form the plurality of bubble chambers 16 and the plurality of bubble cells 28, 30.

An air flow channel 46 is formed between the second bubble layer 12 and the air channel layer 14. The air flow channel 46 preferably includes sealing a first edge 48 of the air channel layer 14 to the first edge 44 of the second bubble layer 12; sealing a second edge 50 of the air channel layer 14 to a second edge 52 of the second bubble layer 12; and sealing a channel area 54 of the air channel layer 14 to the second bubble layer 12 to form the air flow channel 46 and a plurality of cross air fill passages 56. The channel area 54 includes an air flow channel boundary 58, a first cross air fill boundary 60 and a second cross air fill boundary 62. Sealing the first edges of the second bubble layer 12 and the air channel layer 14 forms one side of the air flow channel 46 and the air flow channel boundary 58 forms the other side of the air flow channel 46.

One end of the cross air fill passage 56 communicates with the air flow channel 46 and continues across a width of the bubble chamber 16 to substantially the second chamber edge line 26. A fill slit 64 is preferably formed through the second bubble layer 12, such that it communicates with the other end of the cross air fill passage 56. However, other types of openings could also be used besides a slit. The cross-hatching of the channel area 54 represents the area where attachment occurs between the second bubble layer 12 and the air channel layer 14. The attachment between the second bubble layer 12 and the air channel layer 14 is preferably implemented with any suitable adhesive. The channel area 54 further includes an inner perimeter 66 to decrease the amount and cost of adhesive used to join the second bubble layer 12 to the air channel layer 14. The perimeter of the channel area 54 surrounds substantially all of the surface area between the second bubble layer 12 and the air channel layer 14.

The channel area 54 shows a preferable geometric shape, but the channel area 54 should not be limited to the illustrated geometric shape. The edges, lines and patterns of the first bubble layer 10, the second bubble layer 12 and the air channel layer 14 may also be attached to each other with heating sealing, glue, ultraviolet cured glue, adhesive, ultraviolet cured adhesive or any other suitable bonding agent or method.

An inflation pin 100 of an inflation apparatus (not shown) is inserted into the air flow channel 46, which is disposed between the second bubble layer 12 and the air channel layer 14. The continuous strip 1 is pulled through the inflation apparatus, which forces air through the cross air fill passage 56 of each bubble chamber 56. Air 102 flows through each cross air fill passage 56; through each fill slit 64; and fills each bubble cell 28, 30 with air. Air 102 flows to each bubble cell 28, 32 between each adjacent bubble nub 34 and bubble dot 36.

With reference to FIGS. 5-6, inflation of the bubble cells 28, 30 causes the second bubble layer 12 to seal against the air pocket layer 14 in the areas of the plurality of air flow sealing lines 32. Air 102 is prevented from escaping the bubble chamber 16 through the cross air fill passage 56, because the plurality of air flow sealing lines 32 and plurality of bubble nubs 34 act as a check valve to prevent air flow out of the cross air fill passage 56.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An end user filled protective packaging with self-sealing air bubbles, comprising:
  a first bubble layer;
  a second bubble layer is attached to said first bubble layer to form a plurality of bubble chambers, a plurality of air flow sealing lines extending into each one of said plurality of bubble chambers from one side of a perimeter of said bubble chamber, said plurality of air flow sealing lines are terminated with a plurality of bubble dots, a plurality of bubble nubs extending into each one of said plurality of bubble chambers from an opposing side of said perimeter of said bubble chamber; and
  an air channel layer is attached to said second bubble layer to form an air flow channel, one end of a cross air fill passage communicates with said air flow channel and the other end of said cross air fill passage communicates with a fill opening formed through said second bubble layer, wherein air flows between said second bubble layer and said air channel layer, the air flows through said cross air fill passage and through said fill opening to fill at least one of said plurality of bubble chambers.

2. The end user filled protective packaging with self-sealing air bubbles of claim 1 wherein:
a bubble cell is formed between two adjacent air flow sealing lines of said plurality of air flow sealing lines.

3. The end user filled protective packaging with self-sealing air bubbles of claim 1 wherein:
at least one of said plurality of bubble chambers includes said first chamber edge line, a second chamber edge line, a first chamber end line and a second chamber end line.

4. The end user filled protective packaging with self-sealing air bubbles of claim 1 wherein:
said fill opening is a slit.

5. The end user filled protective packaging with self-sealing air bubbles of claim 1 wherein:
said air channel layer is attached to said second bubble layer to form a channel area, said channel area includes a circumferential border and an inner perimeter, said circumferential border surrounds substantially all of the surface area between said second bubble layer and said air channel layer.

6. The end user filled protective packaging with self-sealing air bubbles of claim 5 wherein:
said air flow channel is formed between a first edge of said air channel layer and an air flow channel boundary of said channel area.

7. The end user filled protective packaging with self-sealing air bubbles of claim 5 wherein:
said cross air fill passage is formed between a first cross air fill boundary and a second cross air fill boundary of said channel area.

8. An end user filled protective packaging with self-sealing air bubbles, comprising:
a first bubble layer;
a second bubble layer is attached to said first bubble layer to form a plurality of bubble chambers, a plurality of air flow sealing lines extending into each one of said plurality of bubble chambers from one side of a perimeter of said bubble chamber, said plurality of air flow sealing lines are terminated with a plurality of bubble dots, a plurality of bubble nubs extending into each one of said plurality of bubble chambers from an opposing side of said perimeter of said bubble chamber, said plurality of bubble dots being aligned with said plurality of bubble nubs; and
an air channel layer is attached to said second bubble layer to form an air flow channel, one end of a cross air till passage communicates with said air flow channel and the other end of said cross air fill passage communicates with a fill opening formed through said second bubble layer, wherein air flows between said second bubble layer and said air channel layer, the air flows through said cross air fill passage and through said fill opening to fill at least one of said plurality of bubble chambers.

9. The end user filled protective packaging with self-sealing air bubbles of claim 8 wherein:
a bubble cell is formed between two adjacent air flow sealing lines of said plurality of air flow sealing lines.

10. The end user filled protective packaging with self-sealing air bubbles of claim 8 wherein:
at least one of said plurality of bubble chambers includes said first chamber edge line, a second chamber edge line, a first chamber end line and a second chamber end line.

11. The end user filled protective packaging with self-sealing air bubbles of claim 8 wherein:
said fill opening is a slit.

12. The end user filled protective packaging with self-sealing air bubbles of claim 8 wherein:
said air channel layer is attached to said second bubble layer to form a channel area, said channel area includes a circumferential border and an inner perimeter, said circumferential border surrounds substantially all of the surface area between said second bubble layer and said air channel layer.

13. The end user filled protective packaging with self-sealing air bubbles of claim 12 wherein:
said air flow channel is formed between a first edge of said air channel layer and an air flow channel boundary of said channel area.

14. The end user filled protective packaging with self-sealing air bubbles of claim 12 wherein:
said cross air fill passage is formed between a first cross air fill boundary and a second cross air fill boundary of said channel area.

15. The end user filled protective packaging with self-sealing air bubbles of claim 8 wherein:
said plurality of air flow sealing lines are terminated with a plurality of bubble dots, said first bubble layer is sealed to said second bubble layer in the area of said plurality of bubble dots.

16. An end user filled protective packaging with self-sealing air bubbles, comprising:
a first bubble layer;
a second bubble layer is attached to said first bubble layer to form a plurality of bubble chambers, a plurality of air flow sealing lines extending into each one of said plurality of bubble chambers from one side of a perimeter of said bubble chamber, said plurality of air flow sealing lines are terminated with a plurality of bubble dots, a plurality of bubble nubs extending into each one of said plurality of bubble chambers from an opposing side of said perimeter of said bubble chamber, said first bag layer is sealed to said second bag layer in the area of said plurality of air flow sealing lines, said plurality of bubble dots and said plurality of bubble nubs; and
an air channel layer is attached to said second bubble layer to form an air flow channel, one end of a cross air fill passage communicates with said air flow channel and the other end of said cross air fill passage communicates with a fill opening formed through said second bubble layer, wherein air flows between said second bubble layer and said air channel layer, the air flows through said cross air fill passage and through said fill opening to fill at least one of said plurality of bubble chambers.

17. The end user filled protective packaging with self-sealing air bubbles of claim 16 wherein:
a bubble cell is formed between two adjacent air flow sealing lines of said plurality of air flow sealing lines.

* * * * *